United States Patent Office 3,493,625
Patented Feb. 3, 1970

3,493,625
SELECTIVE HYDROGENATION OF
CYCLIC POLYENES
Ernest A. Zuech, Bartlesville, Okla., assignor to Phillips
Petroleum Company, a corporation of Delaware
No Drawing. Filed Dec. 10, 1965, Ser. No. 513,123
Int. Cl. C07c 5/16, 5/14
U.S. Cl. 260—666                            6 Claims

ABSTRACT OF THE DISCLOSURE

Monocyclic polyenes containing at least two olefinic double bonds are hydrogenated to the corresponding cyclic monoolefinic compound in the presence of a supported nickel catalyst which has been modified by thiophene or carbon disulfide.

---

This invention relates to a process for the production of cycloolefins containing one double bond by catalytic hydrogenation of cycloolefins containing at least two double bonds. In one aspect this invention relates to the selective hydrogenation of cyclooctadienes and cyclododecatrienes to the corresponding cyclic monoolefins. In another aspect this invention relates to the application of a catalyst which has hitherto not been used for this purpose.

Prior attempts have been made to selectively hydrogenate cycloolefins containing at least two double bonds to the corresponding cycloolefins containing one double bond. These attempts have met with generally low degrees of success. Long, tedious reactions with complicated catalysts of low activity have attained some measure of selective hydrogenation with some cyclic polyenes. However, the same process fails completely when applied to a different cyclic polyene. For example, a palladium catalyst, in association with calcium carbonate, though short lived, will selectively produce cyclic monoolefins on hydrogenation of cyclooctadiene but is completely ineffective with such materials as 1,5,9-cyclododecatrienes. These latter materials have been reported to be selectively hydrogenated to cyclic monoolefins but with difficulty, using long, slow reactions, and with a deficiency of hydrogen. The readily available elemental hydrogen is of necessity by-passed in favor of other hydrogen sources such as alcohols.

This conversion of cyclic polyenes containing at least two double bonds to cyclic monoolefins is of considerable importance because one is provided with molecules having a single point of attack at which certain reactions can be applied to form compounds useful in industry. For example, cyclooctadiene can be selectively hydrogenated to cyclooctene which is preferred intermediate used in the preparation of suberic acid and omega-aminooctanoic acid, a nylon-8 precursor.

Most hydrogenation processes are not useful with cyclic polyenes since these prior art processes suffer from the disadvantage that the hydrogenation is not sufficiently selective. A reduction in the hydrogen consumption is observed when the monoolefin stage has been reached. The reaction does not, however, come to a point even near a standstill in regard to further reaction with the monoolefin, so that it is impossible to recover a completely pure monoolefin. If the hydrogenation is carried on until the theoretical quantity of hydrogen has been consumed, then a reaction mixture is obtained which contains varying quantities of completely hydrogenated starting material, unreacted starting material, and compounds containing more than one double bond. Another problem is that the selectivity of the catalyst varies with the composition of the reaction mixture.

In the art of selective hydrogenation, it is known that a specific catalyst is unpredictable in regard to activity or selectivity when employed for different types of hydrogenation. In this type of hydrogenation, it is paramount that the particular catalyst system possess a high selectivity because catalysts unsatisfactory in this respect are susceptible to irregularities in the hydrogen supply. Thus they would form considerable quantities of saturated compounds if the quantity of hydrogen is increased suddenly. Most prior art processes, therefore, are limited to operation with hydrogen deficient systems. Therefore, it has been desirable to find a process by means of which cyclic polyenes containing at least two olefinic linkages can be hydrogenated with high selectivity to the corresponding monoolefinic compounds with a high degree of efficiency.

It is therefore the object of this invention to provide a process for the selective hydrogenation of cycloolefins containing at least two olefinic linkages to the corresponding compound containing one olefinic linkage.

It is another object to provide a process for the synthesis of cyclooctenes and cycloododecenes in good yields.

Other objects and many of the intended advantages of this invention will be readily appreciated as the same becomes better understood by reference to the following detailed description.

Briefly, the process of this invention comprises the step of selectively hydrogenating cyclic polyenes containing at least two olefinic double bonds to the corresponding cyclic monoolefinic compound in the presence of a supported nickel catalyst which has been modified by contact with a material selected from the group consisting of thiophene and carbon disulfide.

The cyclic polyene compounds which are particularly suitable for the partial hydrogenation in accordance with the process of this invention are the cyclooctadienes and cyclododecatrienes prepared by the catalytic dimerization or trimerization of such conjugated dienes as 1,3-butadiene, isoprene and piperylene. Specific examples of monocyclic dienes which can be hydrogenated according to the process of this invention are 1,5-cyclooctadiene, 1,4-cyclooctadiene, 1,3 - cyclooctadiene, 1,4 - dimethyl - 1,5-cyclooctadiene, 1,5 - dimethyl - 1,5 -cyclooctadiene, cis, trans, trans,-1,5,9-cyclododecatriene, trans, trans, trans,-1,5,9 - cyclododecatriene, 1,5,9 - trimethyl - 1,5,9 - cyclododecatriene, and the like.

The supported nickel catalysts which are employed in the hydrogenation process of this invention can be formed by any of the well known catalyst formation techniques, including impregnation, coprecipitation, and the like. The supported nickel catalyst will generally contain from 5 to 75 weight percent nickel, with the remainder of the catalyst being the supporting material such as silica, silica-alumina, alumina, and the like. Generally speaking, the supported nickel catalysts employed in this process will have surface areas ranging from 25 to 500 square meters per gram.

The process of this invention can be carried out either batchwise or continuously, employing temperatures generally ranging from 125 to 300° C., preferably from 150 to 250° C. The contacting of the cyclic polyene with the modified nickel catalyst is carried out in the presence or absence of a diluent; however, the presence of a diluent is preferred.

Suitable diluents include the saturated hydrocarbons such as paraffins and naphthenes. Specific diluents which can be employed include n-pentane, n-hexane, isooctane, cyclohexane, methylcyclohexane, decalin, and the like. The amount of diluent employed can vary over a wide range, but will generally comprise from about 10 weight percent to 90 weight percent of the cyclic polyene-diluent mixture.

The hydrogen pressure in the reaction zone will generally range from atmospheric to as high as 1000 p.s.i. or higher.

When operating on a batchwise basis, the hydrogen pressures will normally range from about 100 to 800 p.s.i., while, when operating on a continuous basis, it is preferred to operate at about 1 atmosphere hydrogen pressure (gauge).

The residence time in batch operation can vary considerably, ranging from a few minutes to as high as 24 hours, but more preferably from 3 to 8 hours. In a continuous process, the supported nickel catalyst is normally employed as a fixed bed through which the diluent, cyclic polyene and catalyst modifier is passed. Liquid hourly space velocities in a continuous operation of this type will usually be less than 5, preferably less than 1.0, e.g. 0.1 to 0.9.

It is to be noted that when operating in a batch process either of the modified catalysts can be used; however, results indicate that carbon disulfide is a stronger catalyst modifier and that the control of the proper amount of this modifier in a continuous process is more difficult. For this reason, it is preferred to use thiophene when the hydrogenation is to be effected in a continuous manner. In the batch operation, the amount of modifier can be added to the cyclic polyene during the original charge. In the continuous operation, the catalyst modifier can be added continuously with the cyclic polyene or the cyclic polyene can be charged continuously and the catalyst modifier can be added intermittently at various times during the operation.

Whatever manner of operation is chosen, the amount of catalyst modifier will generally range from 0.1 to 20 weight percent based on the cyclic polyene present in the reaction mixture, preferably from 0.3 to 2.0 weight percent.

The following examples are present to illustrate the advantage gained in following the teaching of the subject invention as it permits one to obtain cyclooctenes and cyclododecenes in excellent yields from cyclooctadienes and cyclododecatrienes. Although some saturated material is obtained in this process, it is significant that the amount of saturated material is low, usually less than 10 weight percent of the hydrocarbon charged, while the amount of cyclic polyene passing through the material without being hydrogenated is frequently only a trace, particularly when cyclooctadienes are the feed.

In continuous operation, there is a relationship between the level of catalyst modification and the throughput rate of the polyene. Lower modification levels can be used with the higher rates and vice versa. Reduction in hydrogen pressure with the lower throughput rates is also frequently beneficial to selectivity.

Run No. 7 describes a control run in which the nickel catalyst was not modified according to the procedure outlined hereinabove. It will be noted that the amount of cyclododecane was equal to if not greater than the combined totals of the other components which was clearly indicative that no selectivity to cyclododecene was obtained.

Another outstanding feature of the present invention is that the reaction is sufficiently rapid and free of restricting limitations and that the process is readily and advantageously carried out on a continuous basis.

These examples are to be considered as being illustrative only and not as limiting the scope of the invention.

EXAMPLE I

A one-liter autoclave was flushed with nitrogen, charged with 5 grams of a catalyst comprising 10 percent by weight nickel on Alon C, a commercial high surface flame-hydrolyzed alumina, and heated to 250° C. for 2 hours under 500 p.s.i. hydrogen pressure. The autoclave was then vented, charged with 100 ml. of cyclohexane containing 0.04 gram of carbon disulfide, pressured with 500 p.s.i. hydrogen pressure and heated to 80° C. for one half hour. The autoclave was again cooled, vented, charged with 54 grams of 1,5-cyclooctadiene (COD), heated to 200° C. and then pressured to 500 p.s.i. with hydrogen. The total reaction time on this hydrogenation run after reaching the conditions of 200° C. and 500 p.s.i. hydrogen pressure was 5 hours and 35 minutes. Samples were collected according to the following table:

| | Time when sample drawn, min. | | | | | | |
|---|---|---|---|---|---|---|---|
| | 170 | 200 | 215 | 230 | 245 | 264 | 295 |
| Wt. percent cyclooctane | 4.6 | 5.2 | 6.1 | 6.5 | 7.3 | 8.0 | 9.0 |
| Wt. percent cyclooctene | 91.1 | 93.4 | 93.3 | 93.0 | 92.4 | 91.9 | 91.0 |
| 1,3-cyclooctadiene | 4.2 | 1.4 | 0.6 | 0.5 | 0.3 | 0.1 | 0 |

The results tabulated hereinabove were obtained by GLC analysis of several of the samples.

These data clearly show the standstill nature of this highly selective hydrogenation process.

A number of other selective hydrogenation runs were carried out. These runs were made in a manner essentially identical to that described above, except that other feeds, catalysts, modifiers, operating conditions, etc. were used. The essential data and results from these tests are shown in Table 1. The run described above appears in that table as Run No. 1.

A test was also made using a nickel catalyst for the hydrogenation of cyclododecatriene (CDT) but without the addition of a catalyst modifier. The test, shown as Run No. 7 in Table 1, was carried out similarly to the invention runs except that the reaction temperature was about 100° C. (operation at 200° C. with this highly active but non-selective catalyst would have given even poorer results). After only 17 minutes of reaction time, analysis of the reaction mixture showed that the amount of completely hydrogenated material, cyclododecane, was already equal to, if not greater than, the other components. This was clearly a reaction in which no selectivity to cyclododecene was obtained.

EXAMPLE II

A continuous hydrogenation run was made in which 1,5,9-cyclododecatriene (CDT) was selectively hydrogenated in the presence of a thiophene-modified nickel catalyst.

The apparatus employed in this continuous hydrogenation was a vertical stainless steel tube 20 mm. OD (16 mm. ID) by 60 cm. long. The tube was mounted such that 48 cm. of its length was surrounded by electric heaters. A pump (Lapp) charged the solvent containing the thiophene and the olefin to be hydrogenated to the top of the reactor. Hydrogen was also charged to the top of the reactor through a rotameter. The effluent of reaction product was controlled by a motor valve actuated by a pressure controller.

TABLE 1.—SELECTIVE HYDROGENATION OF CYCLIC POLYENES 1-liter Autoclave  
5 g. Catalyst  
Catalyst pre-treated with $H_2$ 100 ml. Cyclohexane Diluent  
200° C. Reaction Temperature  
500 p.s.i.g. Hydrogen Pressure

| Run No. | G. Polyene | Catalyst | Modifier (Percent of Polyene) | Reaction Time at Sampling (Min.) | Cyclic Monoolefin | Cyclic Diolefin | Cyclo-paraffin |
|---|---|---|---|---|---|---|---|
| 1 | 54 COD | Ni/Al$_2$O$_3$[1] | CS$_2$ (0.074) | 295 | 91.0 | 0.0 | 9.0 |
| 2 | 54 COD | Ni/Al$_2$O$_3$ | Thiophene (0.33) | 147 | 86.1 | 0.2 | 13.7 |
| 3 | 40.5 CDT | Ni/SiO$_2$[2] | Thiophene (0.89) | 159 | [4] 81.4 | 13.2 | 5.4 |
| 4 | 54 COD | Ni/SiO$_2$ | CS$_2$ (0.074) | [3] 245 | 85.9 | 0 | 14.1 |
| 5 | 40.5 CDT | Ni/Al$_2$O$_3$ | Thiophene (0.44) | 296 | [5] 88.5 | 4.6 | 7.0 |
| 6 | 40.5 CDT | Ni/SiO$_2$ | CS$_2$ (0.099) | 258 | [6] 84.9 | 5.7 | 9.2 |
| 7 | 40.5 CDT | Ni/SiO$_2$ | None (0) | [7] 17 | Predominantly Cyclododecane | | |

[1] 10 wt. percent nickel on commercial high surface flame hydrolyzed alumina (Alon-C).  
[2] 10 wt. percent nickel on commercial high surface flame hydrolyzed silica (Cab-O-Sil).  
[3] Included 15 min. at 150° C.  
[4] Included 34.0% cis-cyclododecene and 47.4% trans-cyclododecene.  
[5] Included 32.2% cis-cyclododecene and 56.3% trans-cyclododecene.  
[6] Included 31.2% cis-cyclododecene and 53.7% trans-cyclododecene.  
[7] Tested at 100° C.

The reactor was charged with 23.6 grams (35 ml.) of 10 percent nickel on Alon C tablets followed by 20 ml. of 6 mm. glass beads. After heating for 2 hours at 250° C. and 100 p.s.i. hydrogen pressure, it was allowed to cool and was maintained under hydrogen overnight. The catalyst was then heated under 20 p.s.i. hydrogen pressure. When the temperature reached 200° C., requiring 45 minutes, 100 ml. of cyclohexane containing 0.5 gram of thiophene was pumped through the reaction tube. The treating of the catalyst with this solution required 31 minutes.

During the next several days, a solution of CDT and thiophene in cyclohexane made up by the recipe of 40 grams of CDT and 0.5 gram of thiophene made up to 250 ml. with cyclohexane was pumped over the catalyst at 200° C. and 20–22 p.s.i. hydrogen pressure. After a total of 2069 ml. of this solution had been passed over the catalyst, the hydrogen pressure was lowered to atmospheric and a solution made up from the recipe 40 grams CDT plus 0.25 gram thiophene made up to 400 ml. with cyclohexane was passed over the catalyst bed at 200° C. and one atmosphere hydrogen pressure until a total of 1021 ml. of solution had been passed over the catalyst.

At this time a feed mixture was made up by the recipe of 10 grams of cis, trans, trans-1,5,9-cyclododecatriene plus 0.065 gram of thiophene made up to 125 ml. with cyclohexane was passed through the catalyst bed. Samples were collected as listed below:

| Sample: | Time after Startup, Minutes | Volume, ml. |
|---|---|---|
| 1 | 30 | 14 |
| 2 | 128 | 54 |
| 3 | 158 | 16 |
| 4 | 188 | 17 |

The feed was then changed to a solution made up from 10 grams of all trans-1,5,9-cyclododecatriene plus 0.065 gram of thiophene made up to 125 ml. with cyclohexane and hydrogenation was continued at the same conditions (one atmosphere hydrogen pressure and 200° C.). Samples were collected according to the information tabulated below:

| Sample: | Time after Startup, Minutes | Volume, ml. |
|---|---|---|
| 5 | 35 | 19 |
| 6 | 65 | 17 |
| 7 | 95 | 16 |
| 8 | 125 | 18 |

GLC analysis of the above samples gave the following results:

| Sample No.: | Cyclo-dodecane | trans-Cyclo-dodecene | cis-Cyclo-dodecene | Dienes |
|---|---|---|---|---|
| 2 | 6.7 | 58.3 | 29.4 | 5.5 |
| 3 | 6.2 | 58.6 | 29.5 | 5.7 |
| 4 | 6.8 | 58.7 | 29.8 | 4.8 |
| 5 | 6.9 | 57.4 | 30.4 | 5.3 |
| 6 | 6.8 | 58.8 | 29.5 | 5.0 |
| 7 | 6.7 | 58.8 | 29.3 | 5.2 |
| 8 | 7.0 | 59.0 | 29.4 | 4.6 |

A number of other selective hydrogenation runs were carried out to further illustrate that the invention process is particularly adaptable to continuous operation. These additional runs were made in a manner essentially identical to that described above except that other feeds, catalysts, and operating conditions were used. The essential data and results of these tests are shown in Table 2. The run described above appears in that table as Run No. 8.

TABLE 2.—SELECTIVE HYDROGENATION OF CYCLIC POLYENES—CONTINUOUS OPERATION

Tubular Stainless Steel Reactor  
Fixed Catalyst Bed (35 or 50 ml.)  
Thiophene Modifier Blended with Polyene Feed Cyclohexane Diluent  
200° C. Reaction Temp.  
Hydrogen Pressure, 1 atm. (Gauge)

| Run No. | Feed Polyene | Dilution, ml. soln./g. Feed | LHSV[8] | Catalyst | Thiophene, wt. percent of Feed | On-Stream Time, min. | Cyclic Monoolefin | Cyclic Diolefin | Cyclo-paraffin |
|---|---|---|---|---|---|---|---|---|---|
| 8 | CDT | 12.5 | 0.96 | 10% Ni/Al$_2$O$_3$ | 0.65 | [1] 125 | [2] 88.4 | 4.6 | 7.0 |
| 9 | COD | 11 | 0.90 | 10% Ni/Al$_2$O$_3$ | 0.48 | [3] 475 | 91.8 | 0.1 | 8.1 |
| 10 | COD | 5.5 | 0.96 | 33% Ni/SiO$_2$/Al$_2$O$_3$[4] | 15 | [5] 220 | 90.8 | 0.5 | 8.5 |
| 11 | COD | 5.5 | 1.1 | 33% Ni/SiO$_2$/Al$_2$O$_3$[4] | 1.8 | [6] 225 | 88.9 | 0 | 11.1 |
| 12 | COD | 4.5 | 1.2 | 33% Ni/SiO$_2$/Al$_2$O$_3$[4] | 0.76 | [6] 130 | 85.6 | 0 | 14.4 |
| 13 | COD | 2.8 | 1.1 | 33% Ni/SiO$_2$/Al$_2$O$_3$[4] | 0.46 | [6] 33 | 91.5 | 1.8 | 6.7 |
| 14 | COD | 2.8 | 1.2 | 33% Ni/SiO$_2$/Al$_2$O$_3$[4] | 0.46 | [6] 423 | 91.7 | 0 | 8.3 |
| 15 | COD | 2.8 | 1.7 | 33% Ni/SiO$_2$/Al$_2$O$_3$[4] | 0.46 | [6] 346 | 89.9 | 0 | 10.1 |
| 16 | COD | 2.5 | 1.7 | 33% Ni/SiO$_2$/Al$_2$O$_3$[4] | 0.42 | [6] 90 | 91.6 | 0.3 | 8.2 |
| 17 | COT | 3.3 | 1.7 | 33% Ni/SiO$_2$/Al$_2$O$_3$[4] | 0.56 | [6] 483 | [7] 89.6 | 3.3 | 7.0 |

[1] In addition to extensive on-stream time with other feeds (see text of Ex. 2).  
[2] Included 59.0% trans-cyclododecene and 29.4% cis-cyclododecene.  
[3] Used same catalyst bed of Run No. 8.  
[4] Commercial catalyst (Girdler G-52) ¼ inch tablets broken to 12-25 mesh size.  
[5] In addition to 192 min. on stream with a previous feed.  
[6] Same bed used as in previous run.  
[7] Included 61.3% trans and 28.3% cis.  
[8] Liquid hourly space velocity.

The runs of Table 2 show that both 1,5-cyclooctadiene and various isomeric cyclododecatrienes can be conveniently hydrogenated to cyclic monoolefins in a process which features a simple catalyst, the simplest hydrogenating agent, and a variety of operating conditions. The catalyst system of the process is shown to be long-lived in regard to its activity and, particularly, to its selectivity.

Obviously many modifications and variations of the present invention are possible in the light of the above teachings. It is therefore to be understood that within the scope of the appended claims that the invention may be practiced otherwise than as specifically described herein.

What is claimed is:

1. A process for the catalytic selective hydrogenation of monocyclic polyenes containing at least two olefinic double bonds per molecule with molecular hydrogen, said process comprising the step of hydrogenating said monocyclic polyene by contacting said monocyclic polyene and hydrogen with a supported nickel catalyst which has been modified by contact with a compound selected from the group consisting of thiophene and carbon disulfide.

2. A process according to claim 1 further characterized in that it is a continuous process and the supported nickel catalyst is modified by contact with thiophene.

3. A process according to claim 1 further characterized in that it is a batch process and the supported nickel catalyst is modified by contact with carbon disulfide.

4. A process according to claim 1 wherein the monocyclic polyene is selected from the group consisting of cyclooctadienes and cyclododecatrienes and the amount of catalyst modifier is maintained within the range of 0.1 to 20 weight percent of said monocyclic polyene.

5. A process according to claim 4 for preparing cyclooctene, said process comprising the step of batch hydrogenating cyclooctadiene in the presence of a solvent with a temperature ranging from 125° to 300° C. over a supported nickel catalyst which has been modified by contact with carbon disulfide.

6. A process according to claim 4 for preparing cyclododecene, said process comprising the step of continuously hydrogenating cyclododecatriene in the presence of a solvent with a temperature ranging from 125 to 300° C. over a supported nickel catalyst which has been modified by contact with thiophene.

References Cited

UNITED STATES PATENTS

| | | | |
|---|---|---|---|
| 3,022,359 | 2/1962 | Wiese et al. | 260—666 |
| 3,054,833 | 9/1962 | Donaldson et al. | 260—667 |
| 3,234,121 | 2/1966 | MacLaren | 260—667 |
| 3,251,892 | 5/1966 | Seefelder. | |

PAUL M. COUGHLAN, JR., Primary Examiner

V. O'KEEFE, Assistant Examiner